(12) United States Patent
Wittig

(10) Patent No.: US 6,933,982 B2
(45) Date of Patent: Aug. 23, 2005

(54) METHOD AND APPARATUS FOR FAST ROBUST ESTIMATION OF IMAGE NOISE IN A VIDEO PROCESSING SYSTEM

(75) Inventor: Karl Wittig, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 513 days.

(21) Appl. No.: 10/265,581

(22) Filed: Oct. 7, 2002

(65) Prior Publication Data

US 2004/0066468 A1 Apr. 8, 2004

(51) Int. Cl.[7] .............................................. H04N 5/213
(52) U.S. Cl. ..................................... 348/607; 382/275
(58) Field of Search ................................ 348/607, 624, 348/241, 242, 615, 618; 382/270–275; 375/254, 346; H04N 5/21, 5/213

(56) References Cited

U.S. PATENT DOCUMENTS 5,657,401 A    8/1997  De Haan et al. ............ 382/275
6,154,492 A  * 11/2000  Araki et al. ............ 375/240.16
6,512,854 B1 *  1/2003  Mucci et al. ................ 382/275

FOREIGN PATENT DOCUMENTS

EP          1126729 A1 *  8/2001  .......... H04N/17/00
WO   WO 200195634 A1 * 12/2001  ............ G06K/9/00

* cited by examiner

Primary Examiner—Sherrie Hsia
(74) Attorney, Agent, or Firm—Edward W. Goodman

(57) ABSTRACT

A method and apparatus for determining an image noise estimate value in a digital video processing system using only a single video image. In the method and apparatus, SAD values in the video image are calculated. For each SAD value, a determination is made as to whether the SAD value falls within one or more of a plurality of predetermined SAD value ranges, each of which corresponds to a prospective image noise estimate value. The determination is made concurrently for all of the predetermined SAD value ranges. For each one of the SAD value ranges, the number of SAD values that fall within that predetermined SAD value range is counted. The prospective image noise estimate having a count value that meets predetermined criteria is then selected as the image noise estimate value in the digital video processing system.

21 Claims, 3 Drawing Sheets

| | | SAD | | | INCREASING | | | | →| |
|---|---|---|---|---|---|---|---|---|---|---|
| 20 | | | | | | | | | | |
| | INH0UB | 0 | 1 | 1 | 1 | 1 | | 1 | 1 |
| | INH1UB | 0 | 0 | 1 | 1 | 1 | | 1 | 1 |
| LUT 1 | INH2UB | 0 | 0 | 0 | 1 | 1 | | 1 | 1 |
| (UPPER BOUNDS) | INH3UB | 0 | 0 | 0 | 0 | 1 | | 1 | 1 |
| | ... | | ... | ... | ... | ... | ... | ... | ... |
| | INHn-2UB | 0 | 0 | 0 | 0 | 0 | | 1 | 1 |
| | INHn-1UB | 0 | 0 | 0 | 0 | 0 | | 0 | 1 |

| | | | | | | | | | | |
|---|---|---|---|---|---|---|---|---|---|---|
| 22 | | | | | | | | | | |
| | INH0LB | 1 | 0 | 0 | 0 | 0 | | 0 | 0 | 0 |
| | INH1LB | 1 | 1 | 0 | 0 | 0 | | 0 | 0 | 0 |
| LUT 2 | INH2LB | 1 | 1 | 1 | 0 | 0 | | 0 | 0 | 0 |
| (LOWER BOUNDS) | INH3LB | 1 | 1 | 1 | 1 | 0 | | 0 | 0 | 0 |
| | ... | | ... | ... | ... | ... | ... | ... | ... | ... |
| | INHn-2LB | 1 | 1 | 1 | 1 | 1 | | 0 | 0 | 0 |
| | INHn-1LB | 1 | 1 | 1 | 1 | 1 | | 1 | 0 | 0 |

FIG. 3

METHOD AND APPARATUS FOR FAST ROBUST ESTIMATION OF IMAGE NOISE IN A VIDEO PROCESSING SYSTEM

FIELD OF THE INVENTION

This invention relates to video image noise estimation. More particularly, this invention relates to a method and apparatus for estimating video image noise in a video processing system in a single image.

BACKGROUND OF THE INVENTION

Television receivers typically demodulate and video decode (NTSC, PAL, etc.) radio frequency (RF) broadcast video signals, transmitted over the air or distributed over a cable television (CATV) system. The resulting video signals are then used to drive a display device on which the resulting video images are shown. In such receivers, the picture quality may be impaired by channel noise, which typically consists of Gaussian noise whose spectrum is shaped by the transmission channel and by the demodulation and decoding of the video signal. Video processing systems are generally used to improve the quality of the displayed picture when the decoded video signals have been impaired, as they are when channel noise is present.

A number of well-known video processing algorithms are used for image noise reduction. Some of these algorithms perform noise reduction in the spatial domain using so-called "sigma filters." These algorithms require an estimate of the image noise amplitude in order to adaptively perform a level of filtering that reduces the effect of the noise on the image without degrading any more detail than is necessary. The image noise estimations, however, are very computationally intensive, and therefore, difficult to perform at the high speeds required for real-time video processing.

An example of such an image noise estimation algorithm is described in U.S. Pat. No. 5,657,401 issued to De Haan et al. The method and apparatus of U.S. Pat. No. 5,657,401 essentially obtains simple sums of the absolute values of the differences (SADs) between adajcent pixels, and determines whether each sum falls within a specified range, whose lower and upper bounds are both determined by the current value of the noise estimate. The number of these SADs that fall within the range is then counted over the current video image. If the count exceeds a specified threshold number, the current noise estimate is considered valid. If not, a different estimate must be tried. However, because the noise estimate is precisely what this algorithm must determine, successive "trial" values of the noise estimate must be used until the correct value is found. Each estimate typically requires one video image, which in practice usually consists of an interlaced field, so that at most two such estimates can be performed for each video frame. Thus, this method undesirably requires an indeterminate number of frames before it converges to the correct result, and the entire procedure may need to be repeated if the noise level changes (even by a small amount), once again requiring an indeterminate number of frames to converge to the new result.

Since present noise estimation methods are typically implemented in hardware, a noise estimation method that converges in one image and can be efficiently implemented in hardware is greatly desirable.

SUMMARY OF THE INVENTION

A method and apparatus is described for determining an image noise estimate value in a digital video processing system using only a single video image. In the method and apparatus, a plurality of SAD values in the video image are calculated. For each SAD value, a determination is made as to whether the SAD value falls within one or more of a plurality of predetermined SAD value ranges each of which corresponds to a prospective noise estimate value. The determination is made concurrently for all of the predetermined SAD value ranges. The number of SAD values that fall within the predetermined SAD value range for each prospective noise estimate value is counted. The prospective noise estimate value that has a count value which meets predetermined criteria is then selected as the noise estimate value in the digital video processing system.

BRIEF DESCRIPTION OF THE DRAWINGS

FIG. 3 is a graphical representation showing the digital output values of upper and lower boundary look up tables of FIG. 2 as a function of increasing SAD value.

DETAILED DESCRIPTION

Figure 1:
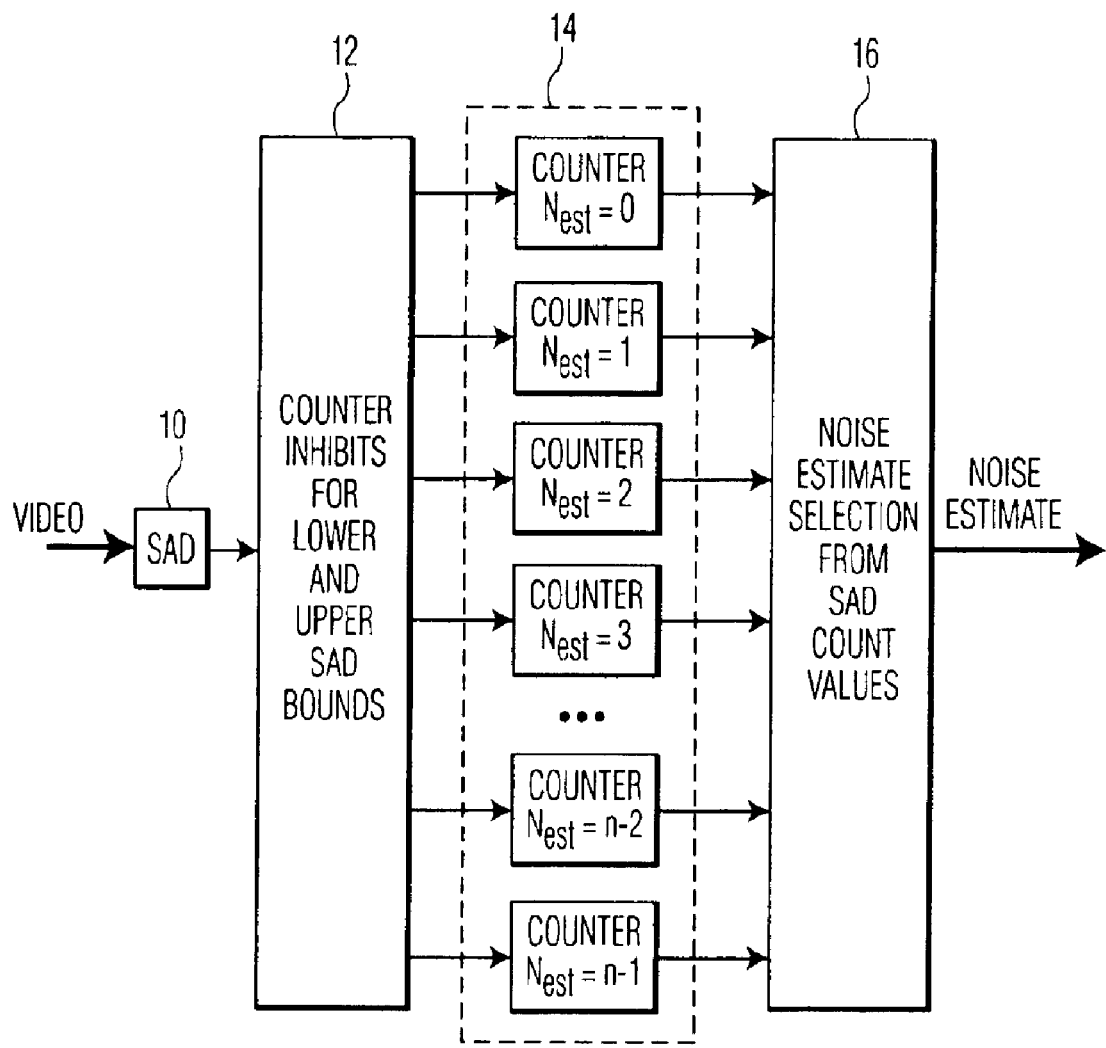
FIG. 1 is a block diagram depicting a noise estimator according to the present invention.

FIG. 1 is a block diagram depicting the structure and function of a noise estimator according to the present invention. The noise estimator includes a difference signal determining block 10, a range comparison block 12, a counter block 14, and a noise estimate selector block 16. The noise estimator may be implemented in hardware, for example, as an integrated circuit formed on a semiconductor chip or the like. The noise estimator is specifically intended for use in a video processing system to improve the quality of the displayed picture when decoded video signals have been impaired. One of ordinary skill in the art will of course recognize that the noise estimator may be useful in other applications as well.

The difference signal determining block 10 inputs a video image signal, obtains sums of the absolute values of the differences between adjacent pixels in each video image of the video image signal, and generates a SAD signal.

The SAD signal generated by the difference signal determining block 10 is applied to the range comparison block 12. The range comparison block 12 may be comprised of a parallel array of comparator devices, each of which is programmed with a predetermined SAD value range delimited by an upper boundary value and a lower boundary value. Each one of the SAD value ranges corresponds to a prospective noise estimate value. The range comparison block 12 compares each SAD value to all the predetermined SAD value ranges in a concurrent or parallel manner. During this concurrent comparison, each comparator device in the array determines if the current SAD value is within the upper and lower boundary values of its programmed SAD value range. This process is repeated for each SAD value calculated in a single video image.

The counter block 14 includes a parallel array of counters $N_{est}=0$, $N_{est}=1$, $N_{est}=2$, $N_{est}=3$ . . . $N_{est}=n-2$, $N_{est}=n-1$. In essence, each one of the counters is associated with one of the prospective noise estimate values by virtue of the counter's association with one of the comparator devices. The count of the counter is increased by an increment of one (1) every time the counter's associated comparator device determines that the current SAD value lies within the upper and lower boundary values of that comparator device's predetermined SAD value range, which in turn, corresponds to one of the prospective noise estimate values.

The count values of the counters $N_{est}=0$, $N_{est}=1$, $N_{est}=2$, $N_{est}=3$ . . . $N_{est}=n-2$, $N_{est}=n-1$ are applied to the noise estimate selector block 16. The noise estimate selector block 16 examines the count values of the counters, and preferably the count values of all the counters simultaneously, and selects one of the propective noise estimate values, based on some criteria, as the noise estimate. One exemplary method that may be used to select a noise estimate value is to identify the smallest count value that exceeds a specified threshold number. The prospective noise estimate value associated with that count value is then selected as the noise estimate value. The noise estimate block 16 may also utilize any other desired selection method for selecting a noise estimate based on the count values.

By comparing each of the SAD values concurrently to all the predetermined SAD value ranges, the noise estimator of the present invention is capable of converging (producing the correct noise estimate value) in a single video image. Further, since the number of predetermined SAD value ranges is typically small, for example, in one exemplary embodiment, only sixteen (16) predetermined SAD value ranges are utilized, the silicon area required for the counters is insignificant, when current digital technologies are used.

Each comparator device utilized in the range comparison block 14 may use two comparators, one performing range comparisons for the upper boundary value of the predetermined SAD value range, and one performing range comparisons for the lower boundary value of the predetermined SAD value range. Thus, as described earlier, the counts of the counters $N_{est}=0$, $N_{est}=1$, $N_{est}=2$, $N_{est}=3$ . . . $N_{est}=n-2$, $N_{est}=n-1$ are increased by increments of 1 every time an associated comparator device determines that the current SAD value lies within the upper and lower boundary values of its programmed predetermined SAD value range.

In a preferred embodiment, the range comparison block 12 inhibits incrementing of all counters $N_{est}=0$, $N_{est}=1$, $N_{est}=2$, $N_{est}=3$ . . . $N_{est}=n-2$, $N_{est}=n-1$ for which the current SAD value is either below the lower boundary value of the predetermined SAD value range or above the upper boundary value of the predetermined SAD value range. This method of incrementing the counters is based on the observation that the upper boundary value of the range comparison is a monotonically increasing function of the prospective noise estimate. This observation leads to the conclusion that all counters whose prospective noise estimate value is less than that of the largest value for which the current SAD value equals or exceeds the upper boundary value are not incremented. A similar observation for the lower boundary value, which is also monotonically increasing with the prospective noise estimate value, shows that all counters for which the prospective noise estimate value is greater than that of the smallest value for which the current SAD value is less than the lower boundary value are not incremented either. Consequently, only those counters that correspond to a contiguous range of prospective noise estimate values will be incremented, or conversely, incrementing of all counters below a lower limit or above an upper limit (both of which are determined by the current SAD value) is inhibited. Accordingly, the range comparison block 12 utilizes greatly simplified logic for performing range comparisons for both the upper boundary value of the predetermined SAD value range and the lower boundary value of the predetermined SAD value range, which further reduces the silicon area, when current digital technologies are used.

Figure 2:
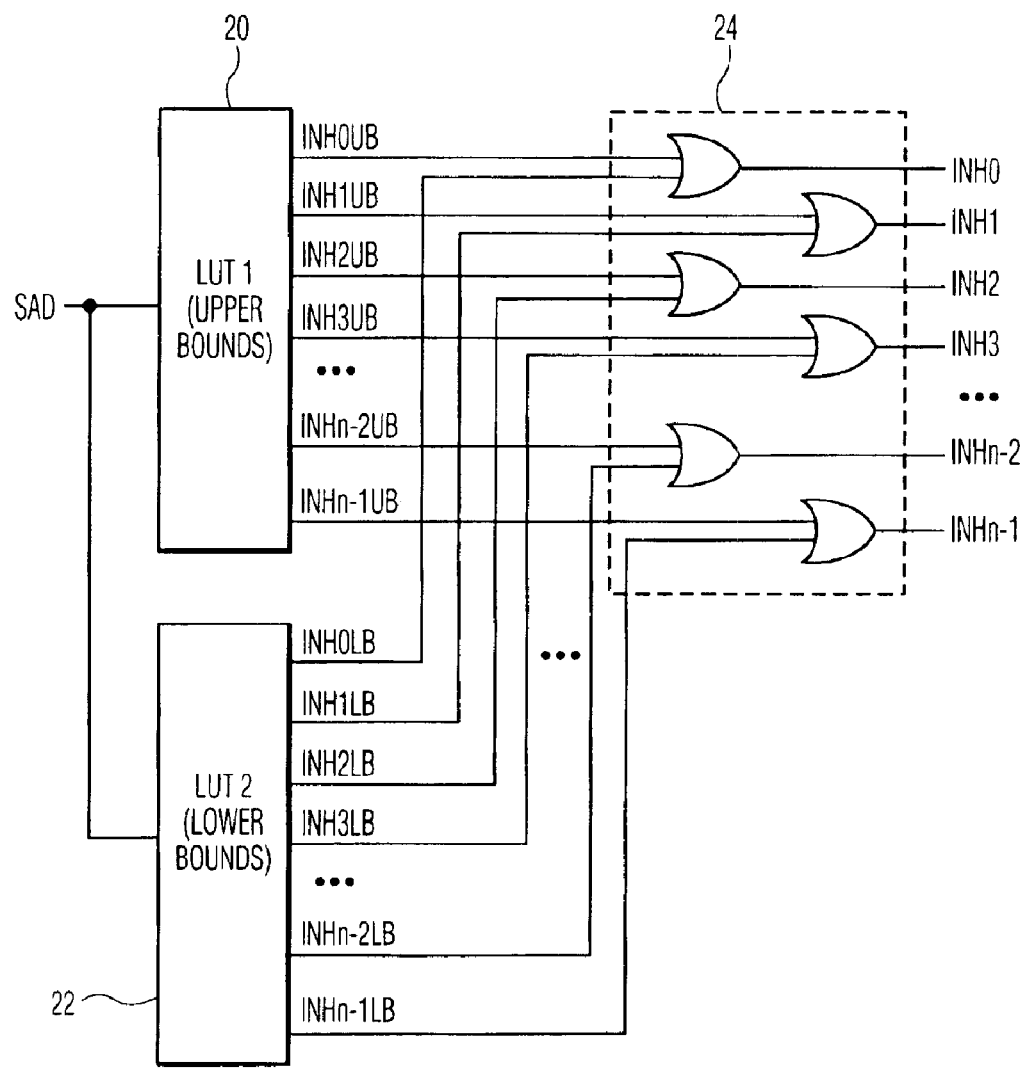
FIG. 2 is a block diagram depicting the logic used for counter inhibiting according to the present invention.

Counter inhibiting may be accomplished in accordance with the present invention using the logic depicted in the block diagram of FIG. 2. The SAD signal is applied simultaneously upper and lower boundary look-up tables 20, 22. The look-up tables are preferably implemented with a single look-up table, such as a read-only memory, but for purposes of illustrating this aspect of the invention, are shown as two separate look-up tables. Further, instead of using a look-up table, the counter inhibiting logic of the present invention may be implemented using digital logic technology.

As shown in FIG. 2, the upper boundary look-up table 20 compares the current SAD value to the upper boundary values of the predetermined SAD value ranges in a concurrent manner, thereby providing a contemporaneous determination, in the form of a parallel array of digital signal outputs INH0UB, INH1UB, INH2UB, INH3UB . . . INHN-2UB, INHn-1UB, of whether the current SAD value is above or below the upper boundary values. Specifically, for each upper boundary value, the upper boundary look-up table 20 outputs a digital signal represented by a high voltage (e.g., 5 volts) corresponding to a "1" if the current SAD value is above the upper boundary value, or a digital signal represented by a low voltage (e.g., 0 volts) corresponding to a "0" if the current SAD value is below the upper boundary value. The digital signal output resulting from the determination made for each upper boundary value is applied to a first input of a respective OR gate in OR gate array 24.

Similarly, the lower boundary look-up table 22 compares the current SAD value to the lower boundary values of the predetermined SAD value ranges in a concurrent manner, thereby providing a contemporaneous determination, in the form of a parallel array of digital signal outputs INH0LB, INH1LB, INH2LB, INH3LB . . . INHN-2LB, INHn-1LB, of whether the current SAD value is below or above the lower boundary values. Specifically, for each lower boundary value, the lower boundary look-up table 22 outputs a digital signal represented by a high voltage (e.g., 5 volts) corresponding to a "1" if the current SAD value is below the lower boundary value, or a digital signal represented by a low voltage (e.g., 0 volts) corresponding to a "0" if the current SAD value is above the lower boundary value. The digital signal output resulting from the determination made for each lower boundary value is applied to a second input of a respective OR gate in the OR gate array 24.

The OR gates of OR gate array 24 generate a parallel array of digital signal outputs INH0, INH1, INH2, INH3 . . . INHN-2, INHn-1, which are respectively applied to the counters $N_{est}=0$, $N_{est}=1$, $N_{est}=2$, $N_{est}=3$ . . . $N_{est}=n-2$, $N_{est}=n-1$ of the counter block 14 (FIG. 1). Incrementing of a counter is inhibited if the output of its respective OR gate is 1, i.e., 1 is applied to one or both of the inputs of the OR gate. Incrementing of the counter occurs if the output of its respective OR gate is 0, i.e., 0 is applied to both inputs of the OR gate.

As depicted in FIG. 3, the parallel vertical arrays of 0's and 1's corresponding to the digital signal outputs INH0UB, INH1UB, INH2UB, INH3UB . . . INHN-2UB, INHn-1UB of the upper boundary look-up table 20, as a function of increasing SAD value, are spaced further apart than the parallel vertical arrays of 0's and 1's corresponding to the digital signal outputs INH0LB, INH1LB, INH2LB, INH3LB . . . INHN-2LB, INHn-1LB of the lower boundary look-up table 22. The differential output spacing represents that as a function of increasing prospective noise estimate value, the upper boundary values of the predetermined SAD value ranges increase more rapidly than the lower boundary values of these ranges. In other words, for a given prospective noise estimate value, the upper boundary value is equal to some multiple greater than unity times the lower boundary value. For example, as a function of prospective noise estimate value, the upper boundary values may increase 1.5 times more rapidly than the lower boundary values. Accordingly, for a given SAD value, overlapping of predetermined SAD value ranges occur. Thus, counter incrementing occurs for a set of overlapping SAD value ranges where the upper and lower boundary values are both 0. This produces incrementing of the corresponding counter because both inputs of its associated OR gate are 0, which in turn generates a 0 at the output of that OR gate. On the other hand, counter incrementing is inhibited where either one, or both the upper and lower boundary look-up table outputs are 1. This inhibits incrementing of the corresponding counter because one or both inputs of its associated OR gate are 1, which in turn generates a 1 at the output of that OR gate.

The logic depicted in FIGS. 2 and 3 enables inhibition of the counters when the current SAD is not within the upper and lower boundary values of the predetermined SAD value ranges. Moreover, this logic advantageously does not require a significant amount of silicon area.

The noise estimator of the present invention may be implemented in any suitably arranged video processing system including, without limitation, television receivers, television broadcast systems, personal computers (PCs) containing advanced video processing circuits and related video processing software and the like. Further, in addition to being implemented as hardware, the noise estimator may also be implemented as computer-executable instructions and data stored on a hard disk drive of a PC or on a removable storage medium which may be a CD-ROM disk, a DVD disk, a floppy disk or the like.

While the foregoing invention has been described with reference to the above embodiments, various modifications and changes can be made without departing from the spirit of the invention. Accordingly, such modifications and changes are considered to be within the scope of the appended claims.

What is claimed is:

1. A method of determining an image noise estimate value in a digital video processing system using only a single video image, the method comprising the steps of:
   providing a plurality of predetemined SAD value ranges, each predetermined SAD value range corresponding to a prospective image noise estimate value;
   determining, in a concurrent manner, if a SAD value calculated in the video image falls within one or more of the predetermined SAD value ranges;
   repeating the determining step for other SAD values calculated in the video image;
   for each one of the prospective image noise estimate values, counting the number of SAD values that fall within that prospective image noise estimate value's corresponding predetermined SAD value range;
   selecting, as the image noise estimate value, the prospective image noise estimate value that has a count value which meets predetermined criteria.

2. The method according to claim 1, wherein the predetermined criteria comprises the prospective image noise estimate value having the smallest number of counts that exceeds a specified threshold number.

3. The method according to claim 1, wherein the determining step is performed by comparing, in a concurrent manner, the SAD value to the predetermined SAD value ranges.

4. The method according to claim 1, wherein each of the predetermined SAD value ranges is delimited by an upper boundary value and a lower boundary value.

5. The method according to claim 4, wherein the upper and lower boundary values monotonically increase as a function of increasing image noise estimate value.

6. The method according to claim 5, wherein the upper boundary values increase more rapidly than the lower boundary values.

7. An apparatus for determining an image noise estimate value in a digital video processing system using only a single video image, the apparatus comprising:
   a range comparison device programmed with a plurality of predetermined SAD value ranges, each predetermined SAD value range corresponding to a prospective image noise estimate value, the range comparison device for determining, in a concurrent manner, if a current SAD value calculated in the video image falls within one or more of the predetermined SAD value ranges, wherein the range comparison device performs the determination for other SAD values calculated in the video image;
   counters for counting SAD values that fall within the predetermined SAD value ranges;
   a selector for selecting, as the image noise estimate value, the prospective image noise estimate value that has a count value which meets predetermined criteria.

8. The apparatus according to claim 7, wherein the predetermined criteria comprises the prospective image noise value having the smallest number of counts that exceeds a specified threshold number.

9. The apparatus according to claim 7, wherein the range comparison device includes a parallel array of comparators for comparing, in a concurrent manner, the current SAD value to the predetermined SAD value ranges.

10. The apparatus according to claim 7, wherein the range comparison device includes at least one look-up table for comparing, in a concurrent manner, the current SAD value to the predetermined SAD value ranges.

11. The apparatus according to claim 7, wherein the range comparison device includes digital logic for comparing, in a concurrent manner, the current SAD value to the predetermined SAD value ranges.

12. The apparatus according to claim 7, wherein each of the predetermined SAD value ranges is delimited by an upper boundary value and a lower boundary value.

13. The apparatus according to claim 12, wherein the upper and lower boundary values monotonically increase as a function of increasing noise estimate value.

14. The apparatus according to claim 13, wherein the upper boundary values increase more rapidly than the lower boundary values.

15. The apparatus according to claim 14, wherein the range comparison device includes means for inhibiting incrementing of the counters for which the current SAD value is either below the lower boundary value of the predetermined SAD value range or above the upper boundary value of the predetermined SAD value range.

16. A memory medium for determining an image noise estimate value in a digital video processing system using only a single video image, the memory medium comprising:
   code for providing a plurality of predetemined SAD value ranges, each predetermined SAD value range corresponding to a prospective image noise estimate value;
   code for determining, in a concurrent manner, if a SAD value calculated in the video image falls within one or more of the predetermined SAD value ranges and for repeating the determination for other SAD values calculated in the video image;

code for counting the number of SAD values that fall within each of the prospective image noise estimate value's corresponding predetermined SAD value range;

code for selecting, as the image noise estimate value, the prospective image noise estimate value that has a count value which meets predetermined criteria.

17. The memory medium according to claim 16, wherein the predetermined criteria comprises the prospective image noise estimate value having the smallest number of counts that exceeds a specified threshold number.

18. The memory medium according to claim 16, wherein the code for determining includes code for comparing, in a concurrent manner, the SAD value to the predetermined SAD value ranges.

19. The memory medium according to claim 16, wherein each of the predetermined SAD value ranges is delimited by an upper boundary value and a lower boundary value.

20. The memory medium according to claim 19, wherein the upper and lower boundary values monotonically increase as a function of increasing image noise estimate value.

21. The memory medium according to claim 20, wherein the upper boundary values increase more rapidly than the lower boundary values.

* * * * *